US012544945B2

(12) United States Patent
Aspauza

(10) Patent No.: US 12,544,945 B2
(45) Date of Patent: Feb. 10, 2026

(54) RAZOR HAVING A RAPID CLEANING ELEMENT

(71) Applicant: Alexa Aspauza, Newark, NJ (US)

(72) Inventor: Alexa Aspauza, Newark, NJ (US)

( * ) Notice: Subject to any disclaimer, the term of this patent is extended or adjusted under 35 U.S.C. 154(b) by 0 days.

(21) Appl. No.: 18/096,513

(22) Filed: Jan. 12, 2023

(65) Prior Publication Data

US 2024/0238998 A1 Jul. 18, 2024

(51) Int. Cl.
*B26B 21/40* (2006.01)
*B26B 21/52* (2006.01)
*B26B 21/10* (2006.01)
*B26B 21/22* (2006.01)

(52) U.S. Cl.
CPC ...... *B26B 21/4062* (2013.01); *B26B 21/4012* (2013.01); *B26B 21/523* (2013.01); *B26B 21/10* (2013.01); *B26B 21/22* (2013.01)

(58) Field of Classification Search
CPC ........ B26B 21/50; B26B 21/523; B26B 21/10
See application file for complete search history.

(56) References Cited

U.S. PATENT DOCUMENTS 1,672,310 A * 6/1928 Edgar .................... B26B 21/10 30/528
3,972,114 A * 8/1976 Chao ...................... B26B 21/40 30/41
4,148,139 A * 4/1979 Allen ................. B26B 21/4018 30/34.2
4,300,285 A * 11/1981 Endo .................... B26B 21/165 30/47
4,920,644 A * 5/1990 LaGattuta .............. B26B 21/10 30/53
5,005,288 A * 4/1991 Wilk .................... B26B 21/446 30/41
5,461,781 A * 10/1995 Pirc .................... B26B 21/4062 30/41

(Continued)

FOREIGN PATENT DOCUMENTS

CN 109382853 A * 2/2019
GB 214909 * 5/1924

OTHER PUBLICATIONS

Englsih translation of CN-109382853-A, dated Feb. 26, 2019.*

*Primary Examiner* — Hwei-Siu C Payer
(74) *Attorney, Agent, or Firm* — Joshua Kaplan, Esq; Kaplan Law Practice LLC

(57) ABSTRACT

The present application discloses a manual razor with self-cleaning capabilities having a handle. The hand having a blade housing at its free end. The blade housing having a razor blade held that firmly, but removable held within the blade housing. The blade housing may further contain a spring element that is integrated into the blade housing. The spring element may be adjacent to said blade, with the first end of the spring element connected to the blade housing and the second end of the spring element connected to the cleaning element. The cleaning element is snugly coupled with the cutting area of the blade, preferably encircling both sides of the cutting area, as well as the edge of the blade. The cleaning element is configured to be displaced or to slide forward and back along the length of the blade in an attempt to clear hair bristles and other shaving debris from the surface of the cutting area.

16 Claims, 8 Drawing Sheets

(56) References Cited

U.S. PATENT DOCUMENTS

| | | | | |
|---|---|---|---|---|
| 6,385,850 | B1 * | 5/2002 | Coulthard, Jr. | B26B 21/4062 30/41.5 |
| 2016/0346944 | A1 * | 12/2016 | Sadrialaei | B26B 21/4031 |
| 2022/0266464 | A1 * | 8/2022 | Seferi | B26B 21/52 |
| 2023/0256635 | A1 * | 8/2023 | Glover | B26B 21/4062 30/41 |
| 2024/0238998 | A1 * | 7/2024 | Aspauza | B26B 21/4012 |

* cited by examiner

RAZOR HAVING A RAPID CLEANING ELEMENT

FIELD OF THE INVENTION

The present invention relates to a shaving apparatus having a self-cleaning feature.

BACKGROUND OF THE INVENTION

A razor is an essential tool of self-grooming. Razors are predominantly used to remove unwanted hair from a user's face or other parts of the body. A manual razor consists of at least one blade that is dragged along the surface of the skin to cut away surface hair.

There are primarily two types of razors a safety razor and a straight razor. These come in many sizes and shapes but retain their basic features. A safety razor is comprised of a holding handle having head at one end. The shaving head is perpendicular to the end of the handle and contains at least one razor blade. The razor blade protrudes just far enough above the surface of the shaving head to expose the sharp edge of the blade to the skin, but not far enough to cut the skin. A straight razor contains the shaving head that is in the straight line with the shaving handle, and all or majority of the blade is exposed. Thus, a straight razor may produce a cleaner shave than a safety razor, with the tradeoff that an awkward stoke may lead to a cut or a more serious injury.

Presently both types of razors accumulate shavings during regular operation, with shavings usually sticking to or otherwise remaining on the surface of the blade. These must be regularly rinsed off from a water source or wiped with a rag or a napkin to avoid unduly dulling the blade and decreasing the effectiveness of the razor. A user lacking either water or a rag, will be forced to blow shavings off or brush them off with a hand. Either method is not very effective, with the latter exposing a hand to the risk of a serious injury. Therefore, a cleaning mechanism that is integrated with the razor would be a highly desirable feature.

SUMMARY OF THE INVENTION

It is an object of the present invention to provide a novel and non-obvious razor having a cleaning capability.

It is a further object of the present invention to provide a razor device wherein a cleaning element is integrated with a blade housing.

It is still another object of the present invention to provide a straight razor with integrated cleaning capability that does not obstruct or interfere with normal operation of the razor.

It is still another object of the present invention to provide a safe razor with integrated cleaning capability that does not obstruct or interfere with normal operation of the razor.

The present application discloses a manual razor with self-cleaning capabilities having a handle. The hand having a blade housing at its free end. The blade housing having a razor blade held that firmly, but removable held within the blade housing. The blade housing may further contain a spring element that is integrated into the blade housing. The spring element may be adjacent to said blade, with the first end of the spring element connected to the blade housing and the second end of the spring element connected to the cleaning element. The cleaning element is snugly coupled with the cutting area of the blade, preferably encircling both sides of the cutting area, as well as the edge of the blade. The cleaning element is configured to be displaced or to slide forward and back along the length of the blade in an attempt to clear hair bristles and other shaving debris from the surface of the cutting area.

The spring element, when at rest, is configured to keep the cleaning element to one side of the blade without obstructing the cutting area's surface. The spring element may be easily extended or compressed, depending on whether the spring is an extension or compression spring, respectively, causing the cleaning element to be slid towards the opposite end of the blade housing, sweeping away loose hairs and other shavings in the process. Once the cleaning element is released, the spring tension is intended to return the spring element back to its position of rest at one end of the blade housing.

The cleaning element is connected to a trigger handle that is handled by a user of the razor when activating the cleaning element during the cleaning action of the blade. The trigger handle may connect to the cleaning element through a slot in the blade housing. There may be at least one additional slot in the blade housing having a second trigger handle, which is intended to provide access to the cleaning element from both sides of the razor, at least when describing a straight razor.

The disclosed straight razor may further disclose a casing that may be attached to the first end of the handle through a pivot.

DESCRIPTION OF THE PREFERRED EMBODIMENTS

Figure 1:
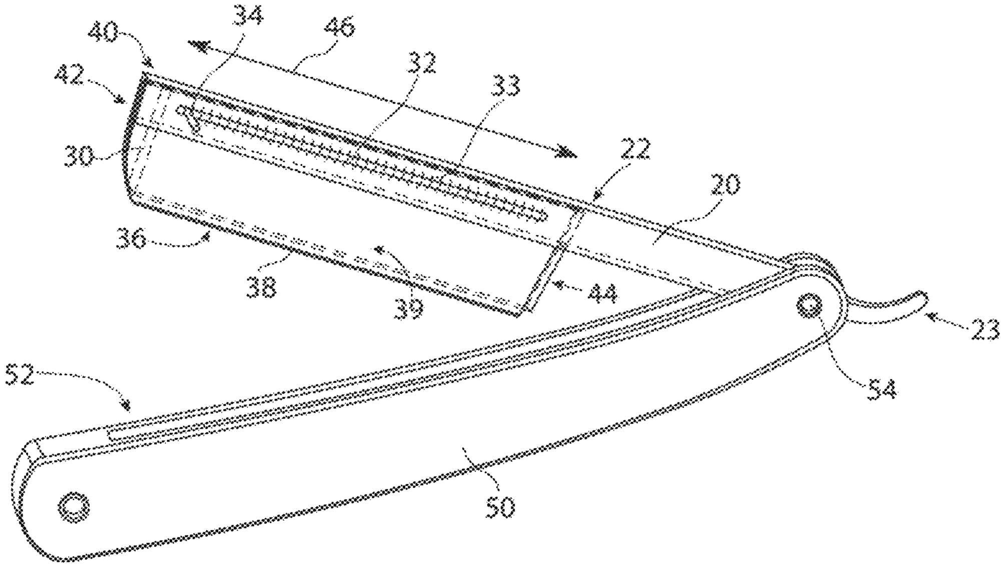
FIG. 1 discloses a perspective view of a straight razor having a folding handle and a blade housing.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
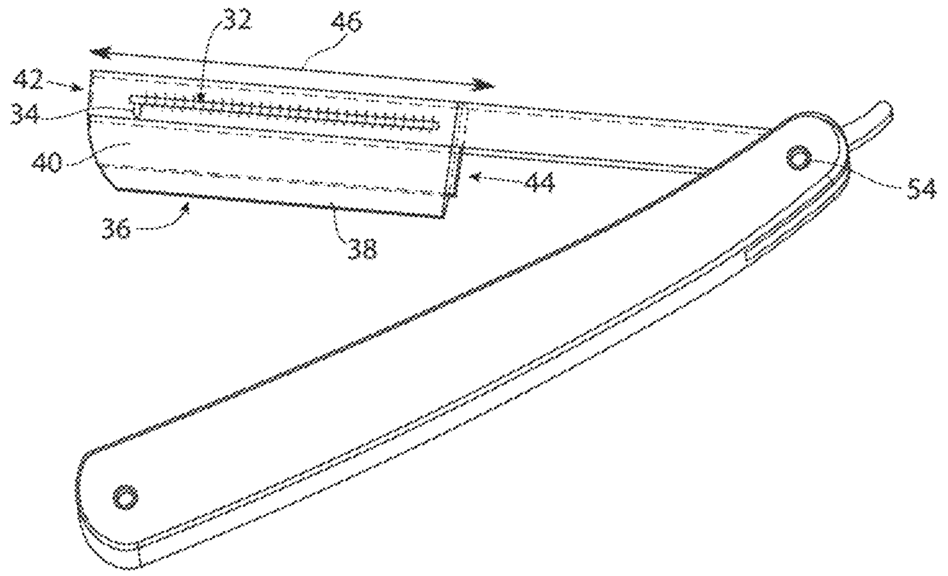
FIG. 2 is a perspective view of the straight razor from a different angle than shown in FIG. 1.

Turning now descriptively to the drawings, and in particular to FIGS. 1 and 2, as well as to other and rest of the disclosed figures, in which similar reference characters denote similar elements throughout the several views, the figures illustrate a razor device 10. A razor 10 contains a handle 20, which at its free end 22 comprises a blade housing 40. Snugly, but firmly held within the blade housing 40 is the blade 36. Shown at the first end 42 is a cleaning element 30, which engages the cutting area 39 of the blade 36 and is able to slide along the length of the blade 36 in the back-and-forth direction 46. The trigger handle 34 provides a user with the grasping ability to display the cleaning element 30 in the direction 46. The cleaning element covers the cutting area 39, as well as the edge 38. The trigger handle 34 may connect directly to the cleaning element 30, or to the spring 33. One end of the spring 33 is mounted at one end of the blade housing 40, and in case of FIG. 1, it is at the second end 44, with the opposing end of the spring 33 connecting to the cleaning element 30. The spring 33 is preferably mounted within the blade housing 40 and above or adjacent to the blade 36. It should be noted that while a blade housing 40 retains both the blade 36 and cleaning element 30, these elements may connect directly to the handle 20 without requiring the blade housing 40.

The razor 10 is shown with a casing 50 that is connected at the first end 23 of the handle 20 with a pivot 54. A hollow slot 52 conceals the blade 36 and most of the blade housing 40, when the razor 10 is not in use.

The trigger handle 34 is visible through a slot 32. The Trigger handle 34 connects through the slot 32 to either the spring 33 or to the cleaning element 30. The spring 33 shown in FIGS. 1 and 2 is a compression spring and is intended to keep the cleaning element 30 at one end 42 while at rest, and then return it to the first end 42 after the cleaning element is passed of the cutting area 39.

Figure 3A:
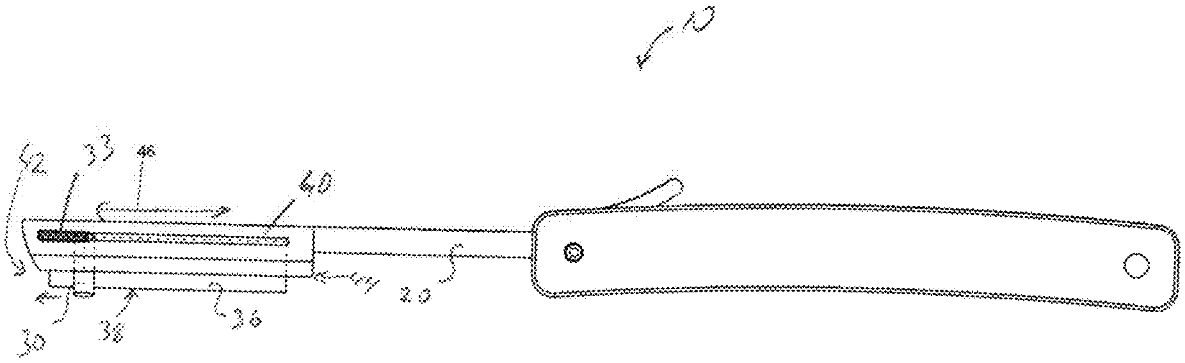
FIG. 3A demonstrates an extension spring attaching to the first end of the blade housing and holding the cleaning element at the first end of the blade housing.

Shown in FIG. 3A a left side of a straight razor 10. Shown is a spring 33, connecting to a cleaning element 30. The spring 33 is an extension spring, configured to maintain the cleaning element 30 at rest in position 42. The spring 33 is an extension spring. Thus, when the cleaning element 30 is propelled towards the second end 44, the spring 33 will return it to the first position 42.

Figure 3B:
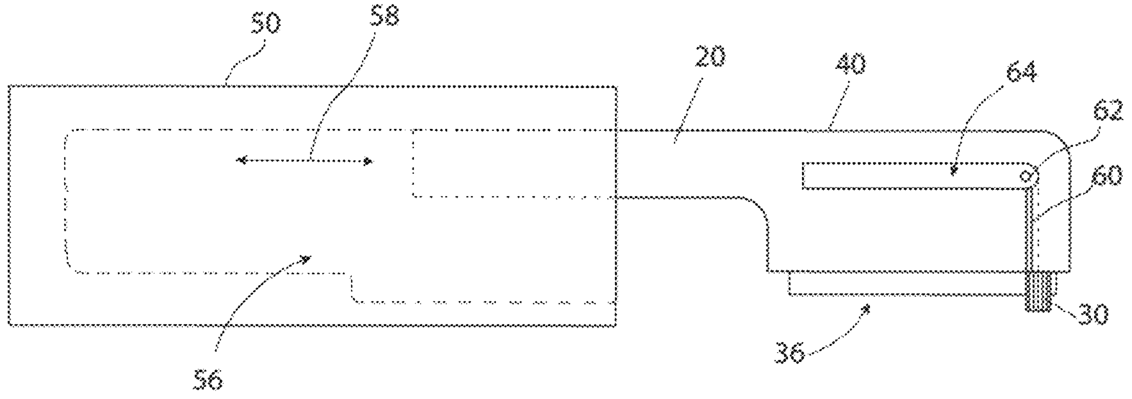
FIG. 3B demonstrates the right side of a straight razor, showing a second slot and having a retractable handle.

The cleaning element 30 may be controlled by a user from both sides of the razor 10. Therefore, shown in FIG. 3B is the right side of the blade housing 40 showing a second trigger handle 62. The second trigger handle 62 may be further connected to the lever 60 which connects to the bottom portion of the cleaning element 30. The second handle 62 is inserted through the second slot 64, which is shown to be on the right side of the blade housing 40 but may exist on any other place of the blade housing 40, such as at the top.

Also shown in FIG. 3B is an alternative embodiment of the case 50, which functions as a sheath that submerges the handle 20 and the blade housing 40 within the cavity 56 when the device is stowed away. The handle 20 with the blade housing 40 is then displaced in direction 58 to deploy the blade 36 or to conceal it.

Figure 4:
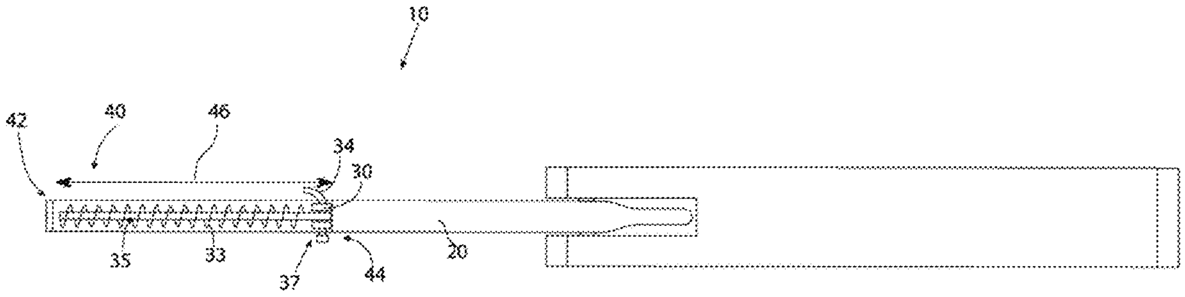
FIG. 4 is a top view of the straight razor showing a compression spring.

FIG. 4 is a top transparent view of the disclosed razor 10. Shown is the spring 33 that travels along a rod 35. The rod is attached at first end 42 and at second end 44 of the blade housing 40. The trigger handle 34 is secured at the end point 37 of the spring 33. The top portion of the cleaning element 30 is shown secured to the spring by the trigger handle 34 at point 37.

Figure 5:
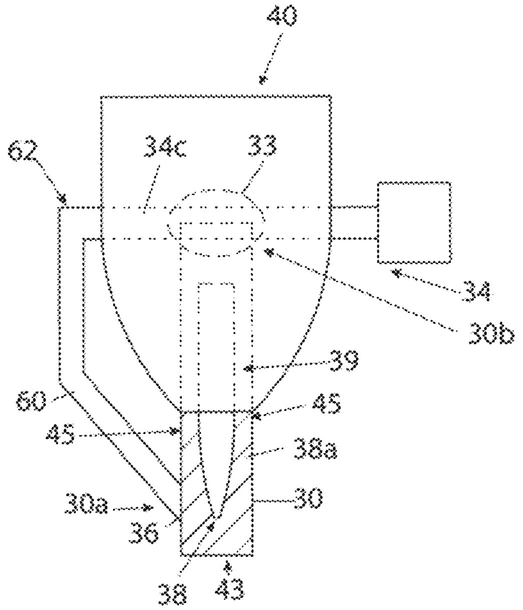
FIG. 5 demonstrates the front detailed view of the razor, showing a first and second trigger arms being in communication with each other.

The cleaning element 30 preferably encircles the blade 36 on three sides and is comprised of a bottom portion 43 and two parallel side portions 45, each in a snug fit with the cutting area 39, as well as the edge 38. As shown in FIG. 5, a cleaning element 30 may have two trigger handles. The first 34 and the second trigger handle 62. The first trigger handle may be connected primarily to the spring 33, while the second trigger handle 62 is linked to the exposed portion 30*a* of the blade cleaning element 30 with a lever 60, and as such, a user moving the cleaning element 30 along the cutting area 39 would exert a more uniform and even force, thus avoiding kinking or twisting either the cleaning element 30 or the edge 38. Alternatively, both the first and second trigger handles 34 and 62 respectively, would both connect to either the spring 33 or to the top portion 30*b* of the cleaning element 30. The trigger handles 34 and 62 may be in communication with each other with an axle 34*c*. The cleaning element 30 may be made from rubber, silicone, and further contain bristles or fabric surface 38*a* that would be directly adjacent to the cutting area 39.

Figure 6:
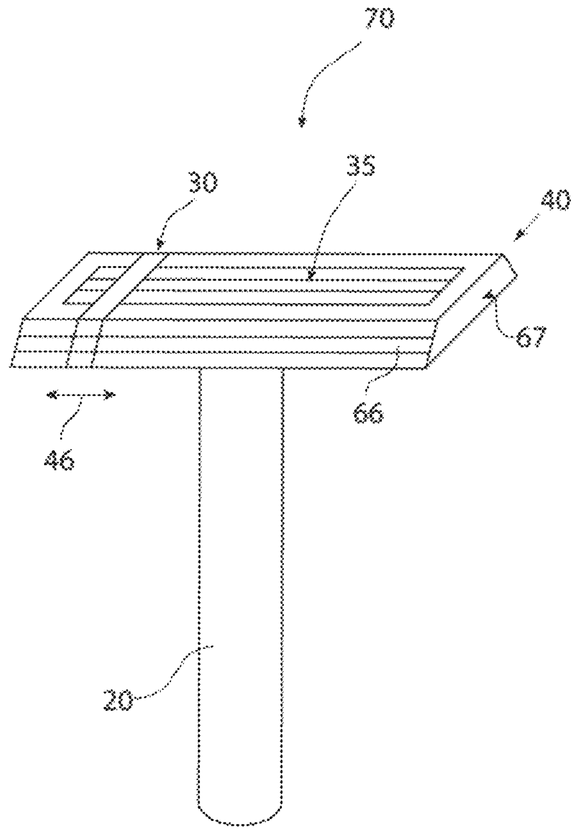
FIG. 6 is a perspective view of a safe razor.
Figure 7:
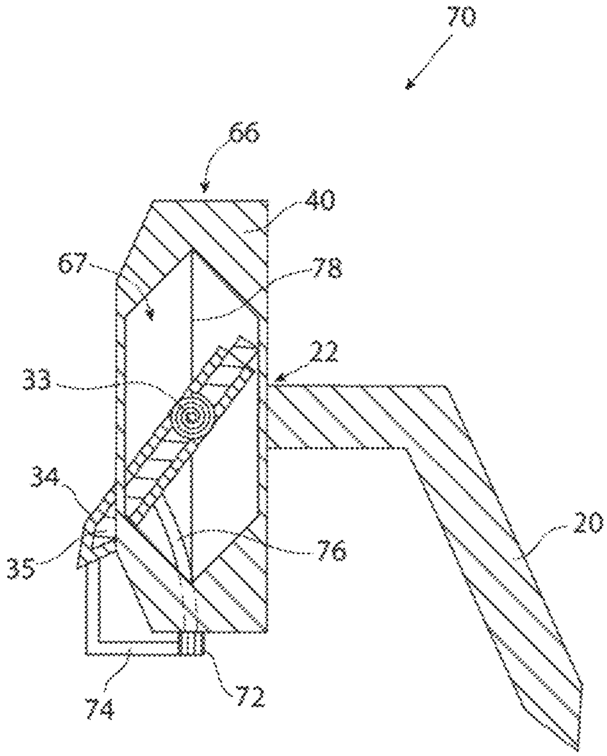
FIG. 7 is a sideview of the safe razor.

FIGS. 6 and 7 demonstrate the cleaning element 30 in the context of a safety razor 70. Shown is the blade housing 40 having at least one blade 35. The at least one blade 35 is enclosed within a perimeter frame 66, with the short wall of the perimeter frame 66 having an opening 67. The cleaning element 30 is configured to slide along the length of the blade housing 40 in the direction 46, with the surface of the cleaning element covering the cutting area and the edge area of all blades 35.

An alternative embodiment of the safety razor 70 is shown in detail on FIG. 7, showing a handle 20, where the blade housing 40 is connecting to the free end 22 of the handle 20. Enclosed within the perimeter frame 66 is at least one razor blade 35 disposed at an angle with respect to the vertical plane of a user's skin (not shown) to achieve its maximum effectiveness.

The cleaning element 30 is within a snug association with the blade 35. The cleaning element 30 is preferably connected to a spring 33, which immobilizes the cleaning element 30 at one side of the blade housing during stowage or shaving operations. The free end of the spring 33 is then mounted against a side frame component 78, which traverses the length of the side opening 67. A trigger handle 72 connects to the cleaning element outside of the blade hosing 40 using a lever 74, or through a slot in the perimeter frame 66 using a lever 76.

The cleaning element 30 shown in FIGS. 6 and 7 brushes hair and other debris from the blades 35. This debris, along with any water, if any rinsing water is used, is then channeled away from the blade housing 40 through a side opening 67.

Although this invention has been described with a certain degree of particularity, it is to be understood that the present disclosure has been made only by way of illustration and that numerous changes in the details of construction and arrangement of parts may be resorted to without departing from the spirit and the scope of the invention. While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims, as currently written or as amended or added in the future. Descriptions of exemplary methods or processes are not limited to inclusion of all steps as being required in all cases, nor is the order that the steps are presented to be construed as required or necessary unless expressly so stated.

What is claimed:

1. A manual razor comprising; a handle; a free end of said handle comprising a blade housing; a razor blade held firmly within said blade housing; a cleaning element, wherein said cleaning element slidably engaging a cutting area of said razor blade; a first trigger handle, said first trigger handle connected to said cleaning element; wherein said cleaning element is at a rest position at one end of said razor blade; wherein said first trigger handle is configured to displace said cleaning element in a back and forth direction along the length of said blade; a slot, said slot being a first slot, running along a length of said blade housing; and wherein said first trigger handle projects through said first slot; and a second slot within said blade housing; wherein said second slot is configured to house a second trigger handle; wherein said second trigger handle is linked to an exposed portion of said cleaning element with a lever, said lever disposed outside of said blade housing and wherein said lever is connected to said second trigger handle on one end of said lever and to said exposed portion on the other end of said lever; and wherein said lever is configured to exert a more uniform and even force on said cleaning element.

2. The manual razor of claim 1, further comprising a first end of a spring mounting within a first end of said blade housing; wherein a second end of said spring is attached to said cleaning element; and wherein said spring maintains said cleaning element at either the first end of said blade housing or a second end of said blade housing while said spring is not under tension.

3. The manual razor of claim 2, wherein said spring is configured to resist motion of said cleaning element from said cleaning element's point of rest to said cleaning element's point of tension; wherein said spring is configured to return said cleaning element toward cleaning element's point of rest.

4. The manual razor of claim 3, wherein said manual razor is a straight razor.

5. The manual razor of claim 4, wherein said cleaning element surrounds said cutting area and an edge of said razor blade.

6. The manual razor of claim 3, wherein said cleaning element surrounds said cutting area and an edge of said razor blade.

7. The manual razor of claim 2, wherein said blade housing is linear to said handle.

8. The manual razor of claim 7, wherein said handle further comprises a casing; wherein said casing is pivotably disposed to a first end of said handle.

9. The manual razor of claim 7, wherein said handle further comprises a casing is; wherein said casing slidably disposed to a first end of said handle.

10. The manual razor of claim 1, wherein said second trigger handle projects away from said blade housing through said second slot; and wherein said second trigger handle is connected to said cleaning element.

11. The manual razor of claim 10, wherein said manual razor is a straight razor.

12. The manual razor of claim 10, wherein said first trigger handle and said second trigger handle are connected.

13. The manual razor of claim 1, wherein said blade housing is linear to said handle.

14. The manual razor of claim 13, wherein said handle further comprises a casing; wherein said casing is pivotably disposed to a first end of said handle.

15. The manual razor of claim 1, wherein said cleaning element surrounds said cutting area of said razor blade.

16. The manual razor of claim 1, wherein said cleaning element surrounds said cutting area and an edge of said razor blade.

* * * * *